United States Patent [19]

Makino et al.

[11] Patent Number: 4,495,976
[45] Date of Patent: Jan. 29, 1985

[54] COMBINATION RADIAL TIRE FOR HEAVY LOAD VEHICLES

[75] Inventors: Shigeo Makino, Tokorozawa; Noboru Sugimura, Kodaira, both of Japan

[73] Assignee: Bridgestone Tire Company Limited, Tokyo, Japan

[21] Appl. No.: 478,802

[22] Filed: Mar. 24, 1983

Related U.S. Application Data

[63] Continuation of Ser. No. 216,716, Dec. 15, 1980, abandoned.

[30] Foreign Application Priority Data

Dec. 25, 1979 [JP] Japan .................. 54-167631

[51] Int. Cl.³ .................. B60C 9/08; B60C 15/06
[52] U.S. Cl. .................. 152/354 R; 152/356 R; 152/362 R; 152/362 CS; 152/359
[58] Field of Search ............ 152/354 R, 354 RB, 355, 152/356 R, 356 A, 362 R, 362 CS, 359

[56] References Cited

U.S. PATENT DOCUMENTS

| | | | |
|---|---|---|---|
| 3,612,138 | 10/1971 | Ravenhall | 152/362 R |
| 3,638,705 | 2/1972 | Devienne et al. | 152/362 R |
| 3,774,663 | 11/1973 | Montagne | 152/362 R |
| 3,921,693 | 11/1975 | Suzuki et al. | 152/362 R |
| 3,964,533 | 6/1976 | Arimura et al. | 152/362 CS |

FOREIGN PATENT DOCUMENTS

| | | |
|---|---|---|
| 2150315 | 10/1971 | Fed. Rep. of Germany . |
| 2211054 | 3/1972 | Fed. Rep. of Germany . |
| 1372098 | 10/1971 | United Kingdom . |

Primary Examiner—Lois E. Boland
Attorney, Agent, or Firm—Sughrue, Mion, Zinn, Macpeak & Seas

[57] ABSTRACT

A combination radial tire for heavy load vehicles comprising a thread portion consisting of a combination of a belt composed of at least two metal cord layers and a carcass composed of at least two organic textile cord plies. In the lower half region of the carcass located at a bead portion, at least one additional reinforcing layer is interposed between the carcass plies and/or another additional reinforcing layer is interposed between the carcass ply and rubber stocks sandwiched between the carcass ply and its turn-up portion, these additional reinforcing layers being extended in parallel with the carcass ply cords and including organic textile cords.

7 Claims, 5 Drawing Figures

COMBINATION RADIAL TIRE FOR HEAVY LOAD VEHICLES

This application is a continuation of application Ser. No. 216,716, filed Dec. 15, 1980 now abandoned.

BACKGROUND OF THE INVENTION

1. Field of the Invention

This invention relates to a combination radial tire for heavy load vehicles.

2. Description of the Prior Art

In tires generally used for heavy vehicles such as a large size truck, bus or the like under a heavy load, a tread portion of a so-called radial tire comprises a carcass reinforced by cord plies including cords arranged in a radial plane inclusive of a rotational axis of the tire or including cords inclined at a very small angle with respect to the radial plane. It is solidly reinforced by a belt composed of a plurality of metal cord layers, particularly a plurality of steel cord layers superimposed about the crown of the carcass and including cords inclined at a relatively small angle with respect to the circumferential line of the tire. The above mentioned radial tire mainly consists of a so-called all metal radial tire in which the above mentioned carcass is composed of one metal cord ply, more particularly one steel cord ply in the same manner as the belt.

Meanwhile, a so-called combination radial tire, in which one metal cord ply of the all metal radial tire is replaced by a plurality of organic textile cord plies, has recently been proposed.

The advantages and disadvantages of the all metal radial tire and of the combination radial tire balance each other. For example, the combination radial tire is lighter in weight and less expensive than the all metal radial tire. On the contrary, the combination radial tire comprises at least one bead portion reinforcing layer arranged outside the turn-up portion of the carcass and including cords, use may be often made of steel cords, and hence tends to easily induce a separation failure at the upper end of this reinforcing layer in the radial direction of the tire if compared with the all metal radial tire. In order to prevent such separation failure, a cover cloth including organic textile cords had heretofore been applied to the upper end of the bead portion reinforcing layer including steel cords. Such conventional a countermeasure, however, is not particularly effective. In addition, it is impossible to repair the separation failure induced at the above mentioned bead portion, and as a result, such separation failure is a vital defect inherent to the combination radial tire and hence has prevented the combination radial tire from being widely used.

SUMMARY OF THE INVENTION

An object of the invention, therefore, is to provide a combination radial tire for heavy load vehicles which can eliminate the above mentioned drawbacks which have heretofore been encountered with the prior art techniques and which can prevent a separation failure from being induced at the upper end of a bead portion reinforcing layer arranged outside the upper end of a turn-up portion of the carcass.

A feature of the invention is the provision in a combination radial tire for heavy load vehicles comprising a carcass composed of at least two organic textile cord plies including cords arranged in a plane containing a rotational axis of the tire or inclined at an extremely small angle with respect to said plane and wound around a bead core from the inside toward the outside thereof to form a turn-up portion, a rubber stock disposed on the bead core and interposed between the carcass itself and the turn-up portion thereof, and at least one bead portion reinforcing layer arranged along the turn-up portion of the carcass and including cords crossed with the cords of said turn-up portion of the carcass, of the improvement comprising at least one additional reinforcing layer arranged at the lower half region of the carcass along said rubber stock and interposed at least between said plies of the carcass itself and/or between said carcass itself and said rubber stock, said additional reinforcing layer including cords which are substantially in parallel with said carcass ply cords.

Further objects and features of the invention will be fully understood from the following detailed description with reference to the accompanying drawings, wherein:

BRIEF DESCRIPTION OF THE DRAWINGS

FIG. 2b is a graph illustrating an elongation strain distribution produced in the inner surface positions of a carcass of the combination radial tire according to the invention shown in FIG. 2a.

DETAILED DESCRIPTION OF THE PREFERRED EMBODIMENTS

The inventors have made extensive investigations and experiments in order to effectively eliminate the above mentioned drawbacks inherent to the combination radial tire for heavy load vehicles and arrived at the present invention.

Figure 1A:
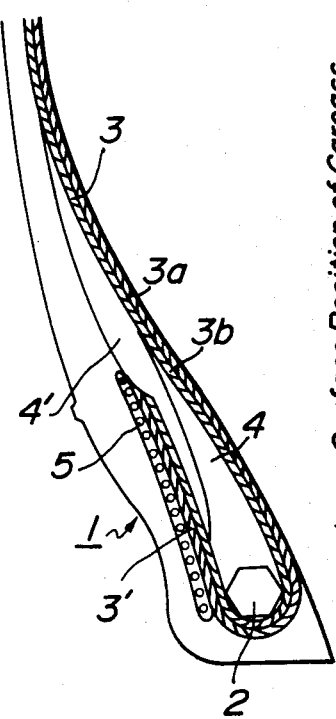
FIG. 1a is a cross-sectional view of a conventional combination radial tire.
Figure 1B:
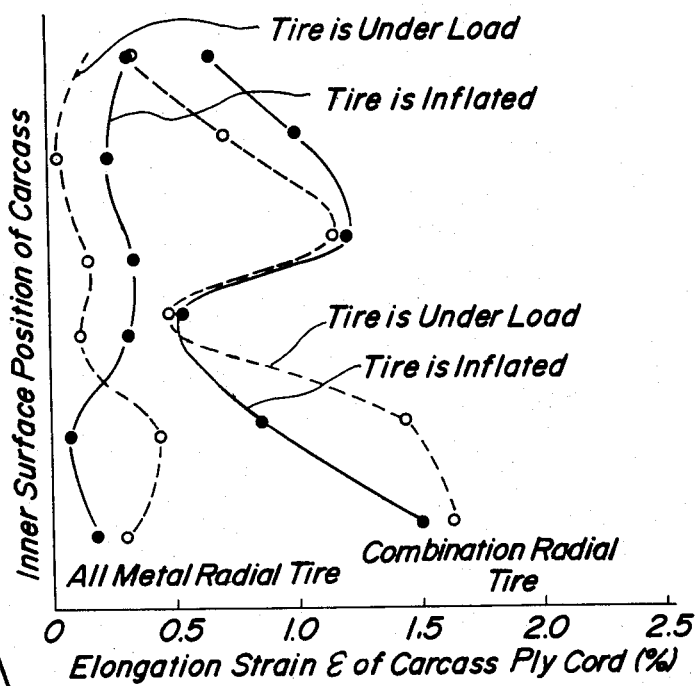
FIG. 1b is a graph illustrating an elongation strain distribution produced in the inner surface positions of a carcass of a conventional combination radial tire as compared with that of an all metal radial tire.

That is, the investigations and experiments have demonstrated that the elongation strain $\epsilon$ of the carcass ply cord of the combination radial tire corresponding to respective inner surface positions of the carcass shown in FIG. 1a is significantly larger than that of the all metal radial tire both when the tire is inflated and when the tire is under load as shown in FIG. 1b.

FIG. 1a shows a conventional combination radial tire. In FIG. 1a, reference numeral 1 designates a bead portion, 2 a bead core, 3 a carcass, 3' a turn-up portion of the carcass, 4, 4' rubber stocks for constituting a bead filler, and 5 a bead portion reinforcing layer composed of steel cords.

In the combination radial tire shown in FIG. 1a, the carcass 3 is composed of two plies 3a, 3b each including polyester fiber cords.

On the contrary, in all metal radial tires, the carcass 3 is composed of one ply including steel cords in the conventional manner. Experimental tests on both kinds of tires were effected by removing an inner liner and directly applying a resistor wire strain gauge to the inner surface of the carcass.

FIG. 1b shows a graph illustrating difference in elongation strain ϵ produced when the all metal radial tire and combination radial tire are inflated by applying an internal pressure of 9 kg/cm² and when these tires are subjected to a JIS 200% load. In FIG. 1b, the elongation strain ϵ produced when the tires are inflated is shown by a full line and the elongation strain ϵ produced when the tires are under load is shown by dotted lines.

The above mentioned difference in the cord elongation ϵ produced in the inner surface positions of the carcass ply exerts a significantly large influence upon the bead portion particularly in the case of the combination radial tire. This difference is considered to be one of the important causes which induce a separation failure at the bead portion which is the drawback inherent to the combination radial tire. Because, it is recognized that particularly large cord elongation at the upper bead portion follows the elongation of the rubber stocks 4, 4' adjacent to the upper end of the steel cords of the bead portion reinforcing layer.

The present invention is based on the above mentioned recognition and applies the following reinforcing measure to the lower half region of the carcass.

That is, at least between the plies of the carcass itself and/or between the ply of the carcass itself and the rubber stock at least one additional reinforcing layer is arranged whose cords are substantially parallel with the cords of the carcass ply and the cords of the additional reinforcing layer are subjected to the internal pressure acting upon the carcass and to the stress produced when the tire is under load. Moreover, the term "carcass itself" means the body portion of the carcass sandwiching the bead core together with the turn-up portion of the carcass.

Figure 2A:
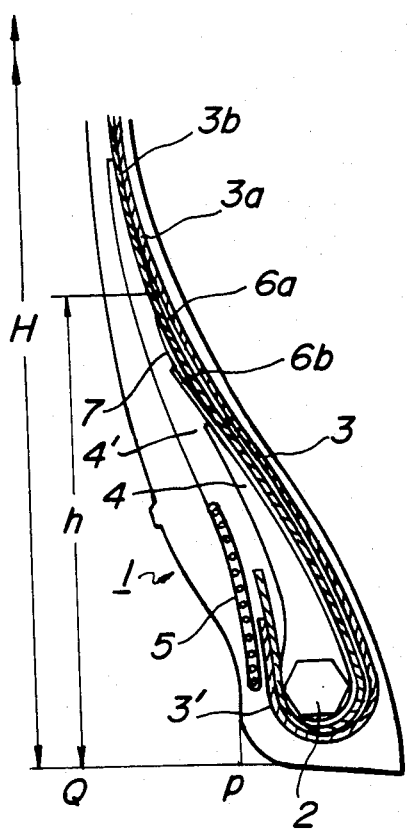
FIG. 2a is a cross-sectional view of one embodiment of a combination radial tire for heavy load vehicles according to the invention.

FIG. 2a shows one embodiment of a combination radial tire according to the invention. In the present embodiment, a carcass 3 is composed of two plies 3a, 3b each including polyester textile cords in the same manner as the conventional combination radial tire shown in FIG. 1a and wound around the bead core 2 from the inside toward the outside thereof to form a turn-up portion 3'.

A bead portion reinforcing layer 5 is arranged along the turn-up portion 3' and composed of steel cords. Rubber stocks 4, 4' are sandwiched between the turn-up portion 3' and the bead portion reinforcing layer 5 on the one hand and the carcass 3 in itself on the other hand. In the lower half region of the carcass located at the bead portion 1, one additional reinforcing layer 6a is interposed between the plies 3a, 3b of the carcass 3 itself while another additional reinforcing layer 6b is arranged between the rubber stocks 4, 4' and the carcass 3 itself, these additional reinforcing layers 6a, 6b, extending in parallel with the cords of the plies 3a, 3b of the carcass 3 and including polyamide textile cords. A cushion rubber 7 is inserted between the upper end portion of the additional reinforcing layer 6b and the rubber stock 4' adjacent thereto on the one hand and the carcass ply 3b on the other hand so as to slightly separate the upper end portion of the additional reinforcing layer 6b from the carcass 3 itself.

Figure 2B:
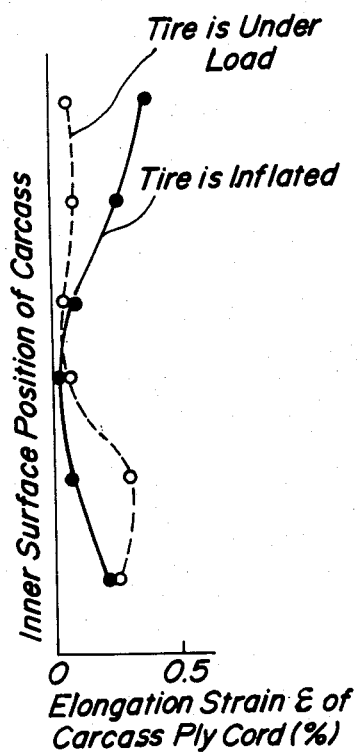

FIG. 2b shows a graph illustrating an elongation strain ϵ produced in the carcass ply located at the inner surface positions of the carcass 3 itself of the combination radial tire according to the invention shown in FIG. 2a and described with reference to FIG. 1b.

The test result shown in FIG. 2b is substantially the same as the strain distribution of the all metal radial tire described with reference to FIG. 1b. That is, even though the carcass of the combination radial tire includes the organic textile cords, not only the elongation strain ϵ of the carcass produced when the tire is inflated as shown by a full line in FIG. 2b but also the elongation strain ϵ of the carcass produced when the tire is under load as shown by dotted line in FIG. 2b are remarkably decreased.

In the combination radial tire used in practice and comprising the above mentioned additional reinforcing layers 6a, 6b for reinforcing the lower half region of the carcass composed of the two plies each including the organic textile cords, the rubber stocks 4, 4' are not elongated in the radial direction of the tire in response to the elongation strain ϵ of the carcass 3, and as a result, it is possible to substantially completely eliminate a separation failure which has frequently been induced at the upper end portion of the bead portion reinforcing layer 5 in the radial direction of the tire.

It is preferable that the cord of the additional reinforcing layer for suppressing the elongation strain of the ply cords at the lower half region of the carcass has a modulus of elasticity on the order of 1 to 2 times larger than that of the organic textile cord of the carcass ply. The additional reinforcing layer including Kevlar cords, that is, aromatic polyamide textile cords is efficiently adapted to the carcass ply including polyester textile cords. But, the organic textile cords of the additional reinforcing layer are not limited to such aromatic polyamide textile cords.

If the additional reinforcing layer is arranged too high with respect to the carcass 3, not only the resistance to bending of the carcass 3 is increased but also the rate of bearing the tension at various portions of the carcass 3 when the tire is inflated becomes troublesome. As a result, in the sectional plane of the bead portion 1, a vertical height h of each of the additional layers 6a, 6b at the inner part of the bead portion 1 measured from the bead base, that is, a straight line PQ drawn from a crossing point P between an extension line of the inner peripheral surface of the bead portion 1 and an extension line of the outside surface of the bead portion 1 and extending in parallel with the rotational axis of the tire to the upper end of the additional reinforcing layer 6a or 6b is made at most 45% of a tire height H measured from the same straight line PQ to the top of the tread portion. The lower limit of the height h is made 15% of the tire height H. If the height h is smaller than 15% of the tire height H, the additional reinforcing layers 6a, 6b do not contribute to a decrease of the carcass cord elongation.

The lower end of the additional reinforcing layers 6a, 6b are wound around the bead core 2 along the turn-up portion of the carcass 3 and fixed to the bead core 2.

The combination radial tire according to the invention is exclusively used under heavy load. As a result, the tread portion consists of a combination of the belt composed of at least two metal cord layers and more particularly at least two steel cord layers and superimposed about the carcass crown and the carcass composed of at least two organic textile cord plies.

In the present embodiment, the organic textile cords of the carcass are composed of polyester textile cords. It is a matter of course that use may be made of materials which are similar in effect to the polyester textile as the organic textile.

The bead reinforcing layer 5 arranged along the turn-up portion of the carcass and reinforcing the bead portion includes metal cords, particularly steel cords which have heretofore been used in practice and crossed with the carcass cords. The upper end of the bead reinforcing layer 5 slightly exceeds beyond the upper end of the turn-up portion of the carcass. It is preferable to fix the inner lower end of the bead portion reinforcing layer 5 to substantially center of the bead core 2. Eventually, the bead portion reinforcing layer 5 may be covered with a cover cloth including organic textile cords.

The invention will now be described with reference to practical examples.

EXAMPLE 1

The bead portion of a test tire having a size of 10.00 R 20 was constructed as shown in FIG. 2a.

The plies 30a, 30b of the carcass 3 including 1500 d/2/3 polyester cords and arranged in substantially radial plane and wound around the bead core 2 from the inside toward the outside thereof to form the turn-up portion 3'. The outside of the turn-up portion 3' in the rotational axis direction of the tire was covered with a bead portion reinforcing layer 5 including metal cords. The cords of the bead portion reinforcing layer 5 cross with the ply cords of the turn-up portion 3' of the carcass 3 at an angle of 60°. Between the carcass 3 itself and the turn-up portion 3' of the carcass rubber stocks 4, 4' were arranged. One layer 6a of the additional reinforcing layers 6a, 6b including 1500 d/3 aromatic polyamide cords was interposed between plies 3a, 3b of the carcass 3 itself, while another layer 6b of the additional reinforcing layers 6a, 6b was interposed between rubber stocks 4, 4' and the carcass 3 itself. The cords of the additional reinforcing layers 6a, 6b were made parallel with the ply cords of the carcass 3. The outer upper ends in the radial direction of the additional reinforcing layers 6a, 6b were located at a position having a height h which corresponds to 30% for the layer 6a and 25% for the layer 6b of the tire height H, while the inner lower ends in the radial direction of the additional reinforcing layers 6a, 6b were wound around the bead core 2 from the inside toward the outside thereof.

It is preferable to make a gap ratio of the cords of the additional reinforcing layers 6a, 6b 0.3 to 0.6 in order to prevent a separation of the outer upper end in the radial direction of the additional reinforcing layers 6a, 6b. The term "gap ratio of the cords" as used herein means a ratio of cord spacing to cord centerline spacing.

In order to more effectively prevent the separation of the outer upper end in the radial direction of the additional reinforcing layers 6a, 6b, it is desirous to separate the outer upper end of that additional reinforcing layer 6b which is adjacent to the rubber stocks or stiffeners 4, 4' from the carcass ply. For this purpose, in the present example, a cushion rubber 7 formed of a soft rubber was interposed between the additional reinforcing layer 6b and the carcass ply 3b.

EXAMPLE 2

Figure 3:
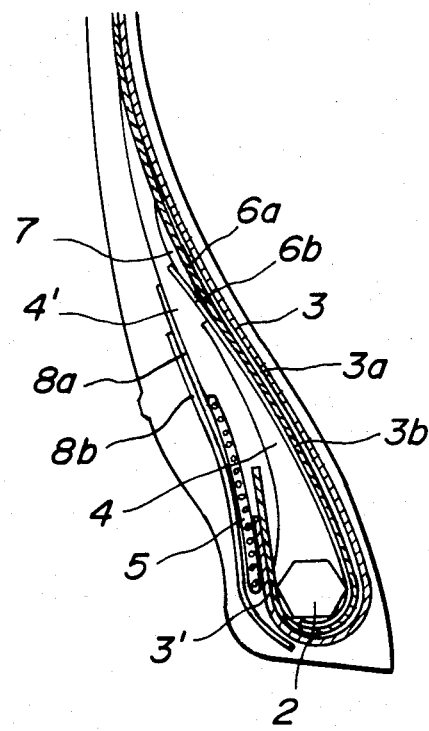
FIG. 3 is a cross-sectional view of another embodiment of a combination radial tire for heavy load vehicles according to the invention.

The bead portion of a test tire having a tire size which is the same as that of the tire described with reference to the Example 1 was constructed as shown in FIG. 3.

In the present example, the bead portion reinforcing layer 5 was covered with two covering clothes 8a, 8b each including organic textile cords. Any other constructions inclusive of the additional reinforcing layers 6a, 6b were made the same as those described with reference to the Example 1.

The running distances in Km until the bead portions of the conventional combination radial tire shown in FIG. 1a and of the combination radial tires according to the invention shown in FIGS. 2a and 3 become broken were measured by an endurance test which makes use of an indoor drum under such condition that the tires were inflated by the internal pressure of 7.25 $Kg/cm^2$ and run at a speed of 80 Km/hr under load of 2700 Kg. The experimental tests have demonstrated the result that if the index of the conventional combination radial tire is 100, then the index of the combination radial tire according to the invention is 135, thereby significantly improving the durability of the bead portion.

As stated hereinbefore, the combination radial tire for heavy load vehicles according to the invention makes use of an additional reinforcing layer properly arranged at the bead portion and is capable of significantly improving the durability of the bead portion of the tire.

What is claimed is:

1. A combination radial tire for heavy load vehicles comprising; a carcass composed of at least two plies including polyester fiber cords arranged in a plane containing a rotational axis of the tire or inclined at an extremely small angle with respect to said plane, all plies of said carcass being wound around a bead core from the inside toward the outside thereof to form a turn-up portion, a rubber stock disposed on the bead core and interposed between the carcass itself and the turn-up portion thereof, and at least one bead portion reinforcing layer arranged along the turn-up portion of the carcass and including cords crossed with the cords of the turn-up portion of the carcass, at least one additional reinforcing layer arranged at the lower half region of the carcass itself along said rubber stock wherein a lower end of said at least one additional reinforcing layer is fixed to said bead core, said additional reinforcing layer interposed at least between said plies of the carcass itself and/or between said carcass itself and said rubber stock, said additional layer including aromatic polyamide textile cords which are substantially in parallel with said carcass ply cords, and said additional reinforcing layer extending along said carcass itself over a region having a vertical height measured from the bead base and corresponding to 15% to 45% of a tire height measured from the same bead base.

2. The tire according to claim 1, wherein said additional reinforcing layer includes organic textile cords.

3. The tire according to claim 1 or 2, wherein the upper end portion in the radial direction of said additional reinforcing layer interposed between said carcass itself and said rubber stock is separated from said carcass itself by a soft cushion rubber arranged therebetween.

4. The tire according to claim 1, wherein the cords of said additional reinforcing layer have a gap ratio of 0.3 to 0.6.

5. The tire according to claim 1, wherein said bead portion reinforcing layer is covered with two covering clothes each including organic textile cords.

6. The tire according to claim 1, wherein said bead portion reinforcing layer includes metal cords.

7. The tire according to claim 1, wherein said additional reinforcing layer comprises a plurality of layers extending over said region to different vertical heights.

* * * * *